United States Patent [19]

Althans et al.

[11] Patent Number: 5,229,684
[45] Date of Patent: Jul. 20, 1993

[54] VIDEO DISPLAY DEVICE WITH PLANAR FRONT SURFACE

[75] Inventors: Richard K. Althans, Long Grove; Raymond G. Capek, Elmhurst; Mark Gartz, Mount Prospect, all of Ill.

[73] Assignee: Zenith Electronics Corporation, Glenview, Ill.

[21] Appl. No.: 727,688

[22] Filed: Jul. 10, 1991

[51] Int. Cl.[5] .................. H01J 29/02; H04N 05/64
[52] U.S. Cl. .................................. 313/402; 313/404; 313/408; 313/477 R; 358/254
[58] Field of Search .......... 313/402, 404, 408, 477 R; 358/254; 312/7.2

[56] References Cited

U.S. PATENT DOCUMENTS

| | | | |
|---|---|---|---|
| 3,139,485 | 6/1964 | Gray et al. | 358/254 |
| 4,438,458 | 3/1984 | Munscher | 358/254 |
| 4,730,143 | 3/1988 | Fendley | 313/402 X |
| 4,873,578 | 10/1989 | Tognoni et al. | 358/254 |

Primary Examiner—Donald J. Yusko
Assistant Examiner—Ashok Patel
Attorney, Agent, or Firm—Roland Norris

[57] ABSTRACT

A CRT bulb with a flat front surface is utilized to provide a video display device having a planar front surface. The display device thus provided is easy to clean, easy to mount flush with planar surfaces, and requires no separate bezel over the display area.

20 Claims, 5 Drawing Sheets

VIDEO DISPLAY DEVICE WITH PLANAR FRONT SURFACE

CROSS REFERENCE TO RELATED APPLICATIONS

This application is related to but no way dependent upon U.S. application Ser. No. 07/728,069 filed concurrently herewith, and U.S. application Ser. No. 07/685,352 now U.S. Pat. No. 5,127,865, both commonly owned by the same assignee.

BACKGROUND OF THE INVENTION

1. Field of the Invention

The present invention relates generally to video display devices and specifically to cathode ray tubes (CRTs) having flat, or planar front surfaces and encased in cabinets so as to present a planar front surface of the entire display unit.

2. Discussion of the Related Art

As seen in FIG. 1, the most common form of cathode ray tube display device consists of a CRT bulb 22 mounted within a protective cabinet 28. The periphery of the tube faceplate 24 then has an escutcheon, or bezel 13, placed around it and attached to the cabinet 28 to finish the appearance of the display unit, hide the edges of the faceplate, and thereby define the display area 14. Unfortunately the bezel 13 tends to collect dust which is wiped from the faceplate. Further, the bezel 13 represents an additional expense to the display unit as a whole. Also, common display unit construction practice dictates that the CRT bulb be laboriously aligned within the cabinet and bezel to match the display screen borders to the visual display aperture created by the bezel.

A display unit having a flat front surface has been recognized as desirable for functional reasons including less light collection by a flat surface as opposed to a spherical surface, and tinting of the flat surface for contrast enhancement, and, also for aesthetic reasons. Thus, in the past, manufacturers have sought to achieve a planar front surface on the display unit by placing a transparent flat panel over the front of the CRT. Such a panel is generally removable in order that the faceplate may still be cleaned. Addition of the transparent flat panel, however, creates additional surfaces for reflection and reduces brightness of the display.

It would therefore be desirable to provide a CRT having a flat faceplate so as to be combined into a video display device having a planar front surface which can be easily cleaned. The display device would also preferably obviate the need for an escutcheon. Proper design of the cabinet could then result in centering of the CRT visual display within the cabinet which is simpler than current systems utilizing an escutcheon. Such a planar surface display device would also present the display surface immediately at the front of the display device rather than being set back and separated from the front surface panel. This may be especially desirable in public use applications where flush mounting of the display device with another planar surface is required. Such a device would also reduce potential sources of glare, reflection, or brightness reduction of the CRT display attendant with overlaid panels, as discussed above.

OBJECTS OF THE INVENTION

It is an object of the present invention to provide a CRT video display device with a substantially planar front surface.

It is a further object of the present invention to provide a planar front surfaced CRT video display whose display screen is as close as possible to the front of the display device.

It is a further object of the invention to eliminate the bezel from the display device.

It is a further object of the invention to produce a CRT which is self centering in its cabinet.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

DETAILED DESCRIPTION OF THE PREFERRED EMBODIMENTS

Figure 1:
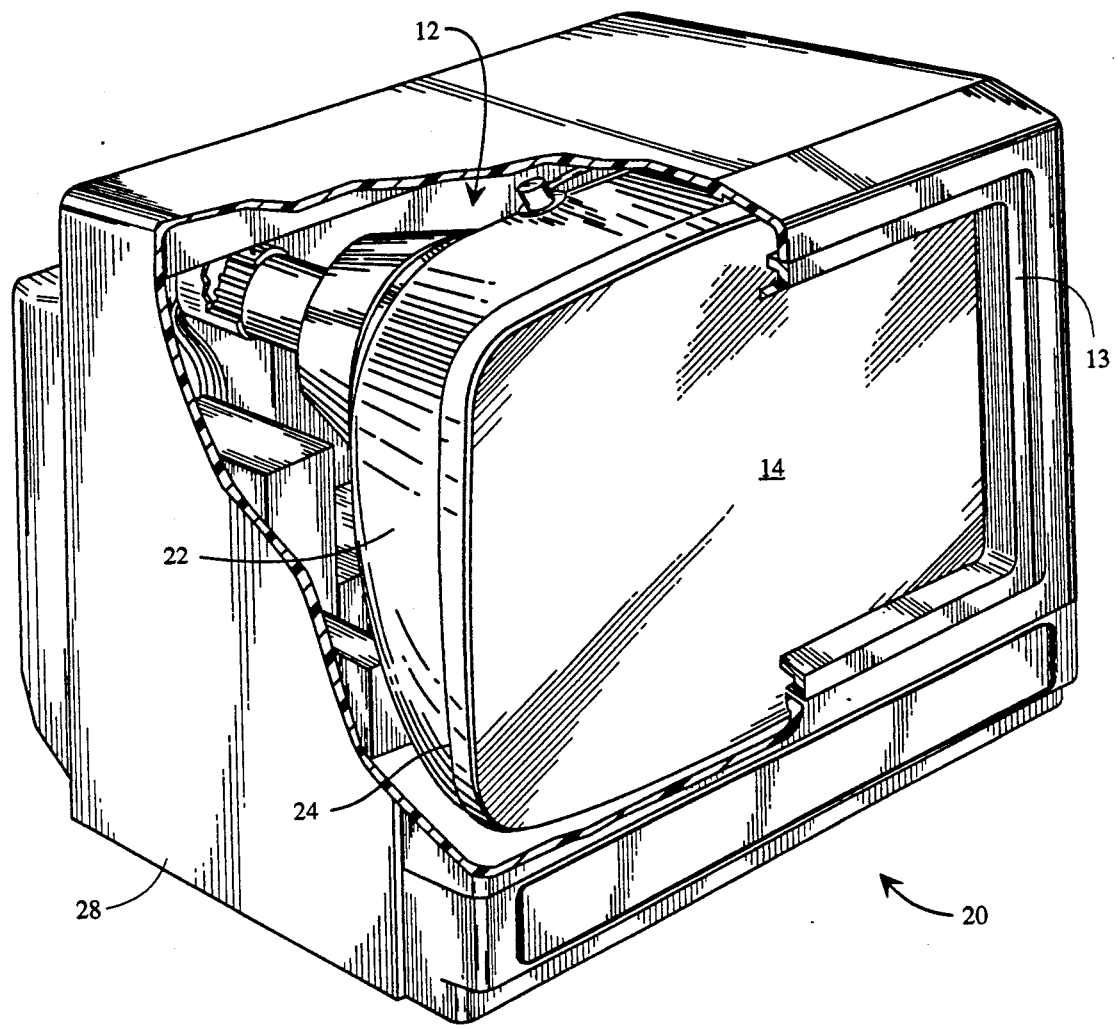
FIG. 1 shows a prior art CRT display device with a bezel surrounding the display area, which is set in from the cabinet.
Figure 2:
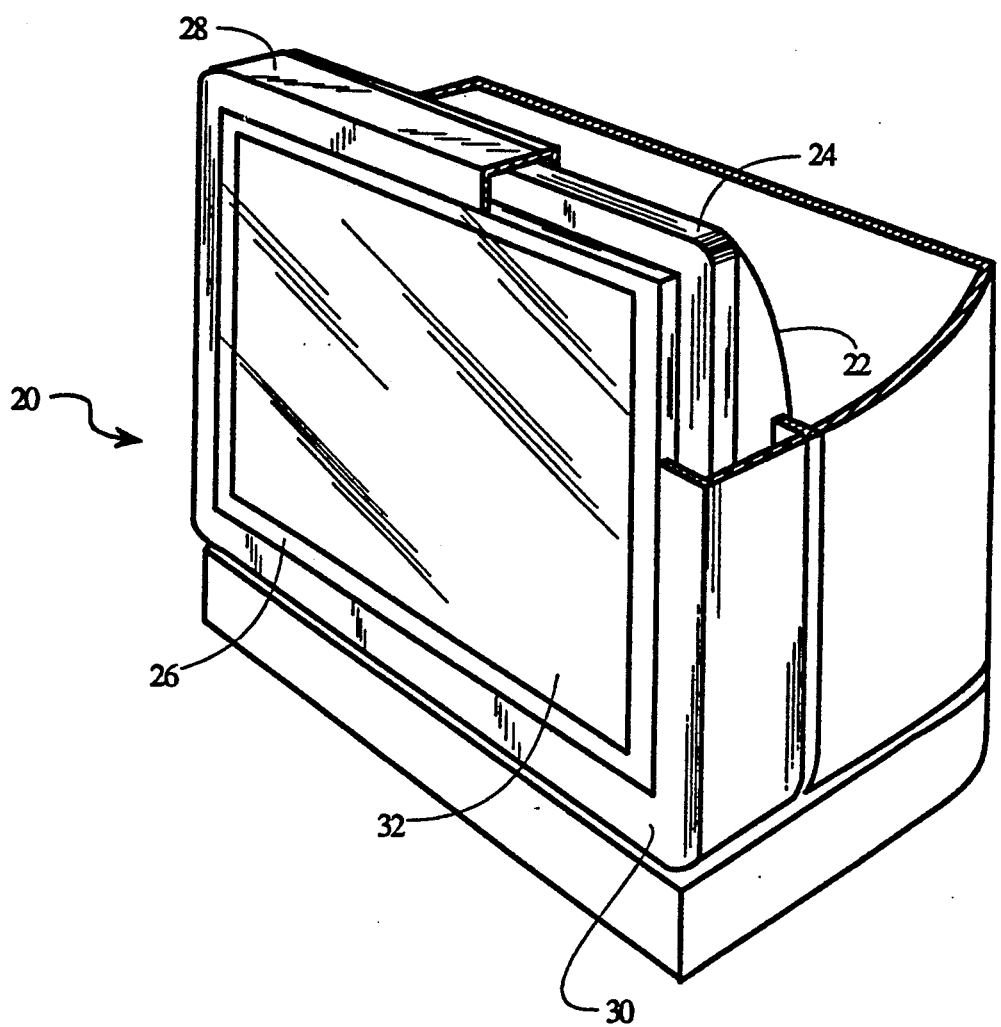
FIG. 2 shows a perspective view of a CRT video display unit according to the present invention.

As seen in FIG. 2, a CRT video display unit 20 according to the present invention is comprised of a CRT bulb 22 having a flat front faceplate 24 with a flat panel 26 superposed over the faceplate 24 and affixed thereto, and a cabinet 28 configured and arranged to provide a front surface 30 coplanar with the exterior surface 32 of the flat panel 26 to present an entirely planar or flat front surface of the display unit 20.

The flat panel 26 may be utilized to impart implosion protection properties to the CRT bulb 22 and be treated to have anti-glare and/or anti-static properties in accordance with known techniques. Suitable attachment of the bulb 22 within the cabinet 28, although not shown, will be understood to exist through techniques known to those having ordinary skill in the art.

Figure 3:
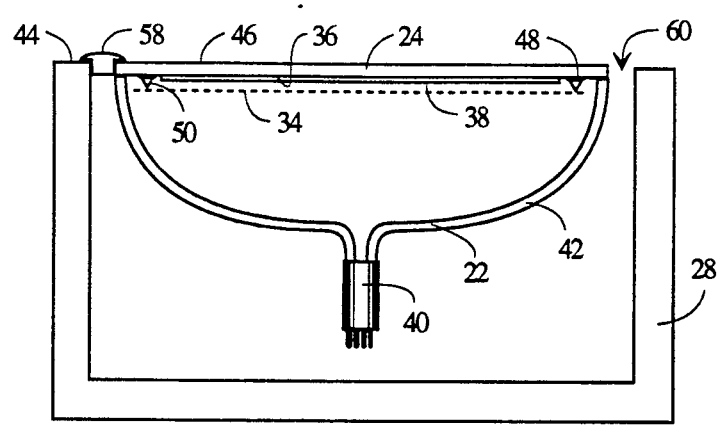
FIGS. 3-5 show cross-sectional views of embodiments of the present invention wherein the flat faceplate of the CRT bulb forms a part of the planar front surface of the display device.
Figure 4:
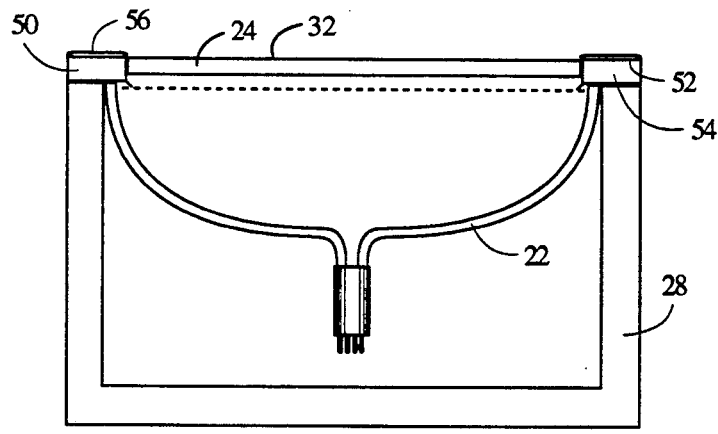
Figure 5:
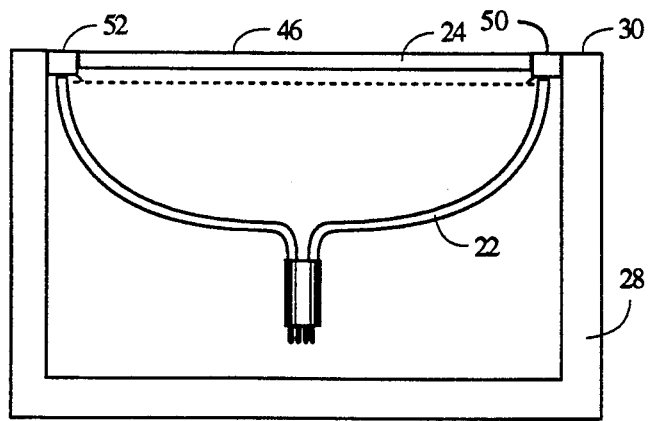

As seen in FIGS. 3-5, a simplified display unit construction may be attained where the flat panel 26 is not needed for implosion protection or the like, as further discussed below.

As seen in FIG. 3, the CRT bulb 22 is of the flat tension mask (FTM) variety and has contained therein a shadow mask 34 comprising a thin, metallic, apertured, foil placed in tension and secured to the CRT bulb flat front faceplate 24 on the interior surface 36 thereof.

The faceplate interior surface 36 further supports a luminescent screen 38 which is excited by electron beams (not shown) from an electron gun 40 to produce a video display as is well known in the CRT art. A funnel 42 is hermetically sealed to the faceplate 24 to form the CRT bulb 22. The funnel 42, as well as the faceplate 24 may provide attachment points for connection of the bulb 22 to the cabinet 28. The cabinet 28 substantially surrounds the bulb 22 except, of course, for the video display portion, or screen 38.

The cabinet 28 of FIG. 3 is constructed so as to have a substantially planar front surface 44 which is co-planar with the exterior surface 46 of the faceplate 24. A dark-colored frit 48, or devitrifiable solder glass, is preferably used to bond the shadow mask support structures 50 to the faceplate interior surface 36 for a more finished cosmetic appearance. Interstitial filler material 58, such as a plastic or the like may be placed in any gap 60 between the faceplate 24 and the cabinet 28 to maintain the planar front surface and help support the bulb within the cabinet.

As seen in FIG. 4, the mask support structures 50 may be placed on the periphery of the faceplate 24. The mask support front surfaces 52 are aligned, or ground if necessary, to be substantially co-planar with the faceplate exterior surface 32. The mask support front surfaces 52 and other exposed surfaces 54 may be covered by the application of finishing materials 56 by hot stamping, spray coating, or the like as necessary.

The cabinet 28 is then secured to the CRT bulb 22 so as to be located entirely behind the flat front surface of the bulb 22 as defined by the co-planar faceplate and mask support structure forward, or front, surfaces 32,52, respectively.

As seen in FIG. 5, the cabinet 28 may alternatively be constructed to have its front surface 30 arranged co-planar with the faceplate exterior surface 46 and the mask support front surface 52. In this case, the mask support structure 50 will serve as a filler material located interstitially between the cabinet 28 and the faceplate 24.

It will be recognized that other filler materials 58 (FIG. 3) may be suitably employed to fill any gaps 60 between the cabinet 28 and faceplate 24 or CRT bulb 22 to serve as a dust barrier and preserve a substantially planar surface therebetween. With a suitable durometer this material will also help retain a fixed alignment of the tube within the cabinet.

Figure 6:
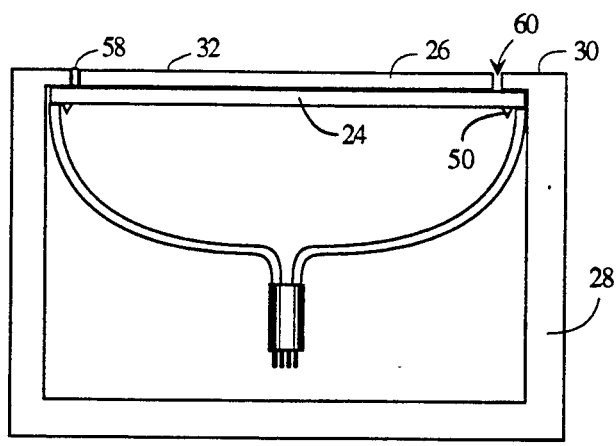
FIGS. 6-11 show cross-sectional views of embodiments of the present invention wherein the flat face plate of the CRT bulb is overlaid with a flat panel, to form at least part of the planar front surface of the display device.

As seen in FIGS. 6-11, a flat panel 26 is superposed over the faceplate 24. The flat panel 26 is preferably affixed by resin to the faceplate and offers implosion protection for the CRT bulb. As seen in the embodiment of FIG. 6, the cabinet 28 overlays the periphery of the faceplate 24 to conceal the edges and mask support structures 50 thereof (mask not shown). The cabinet 28 has a front surface 30 that is co-planar with the exterior surface 32 of the flat panel 26. Filler material 58 may be interstitially placed in any gaps 60 between the cabinet 28 and the flat panel 26 to provide a dust barrier and a substantially planar forward surface for the display unit 20.

Figure 7:
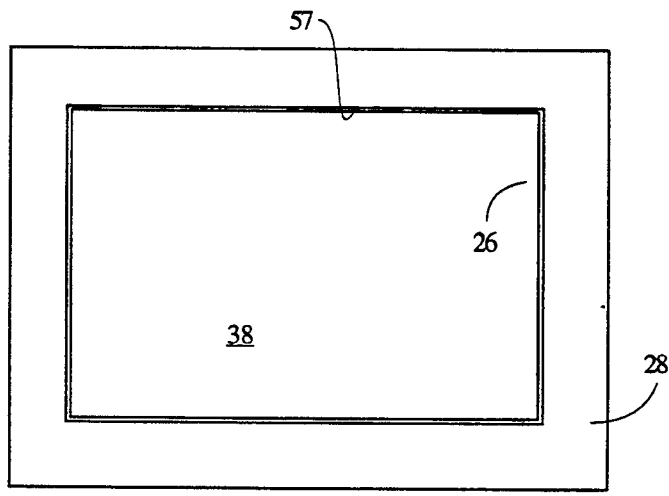

Referring to FIG. 7, with accurate alignment of the flat panel 26 over the screen-bearing faceplate 24, the mating of the edges of the cabinet opening 57 with the edges of the flat panel 26 will provide an automatic centering of the CRT screen 38 within the cabinet 28, thus eliminating cumbersome alignment of the commonly used escutheon, faceplate, and cabinet system.

Figure 8:
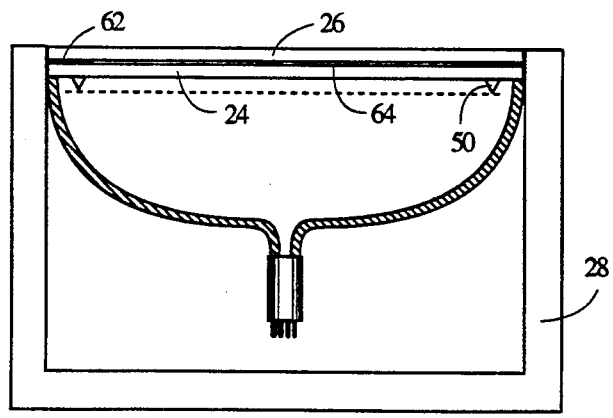

As seen in FIG. 8, the flat panel 26 has paint 62 or other opaque material applied to the periphery of its interior surface 64. The paint 62 covers portions of the bulb 22 which are preferably hidden from view, such as the shadow mask support structures 50, thus providing an inexpensive alternative to a separate escutheon, or bezel, as commonly in use today. The flat panel 26 of the FIG. 8 embodiment is seen to be equal in area to the faceplate 24 which it covers. In making the flat panel area greater than or equal to the faceplate area, the cabinet need not be used to cover the faceplate as was the case in the embodiment of FIG. 6.

Figure 9:
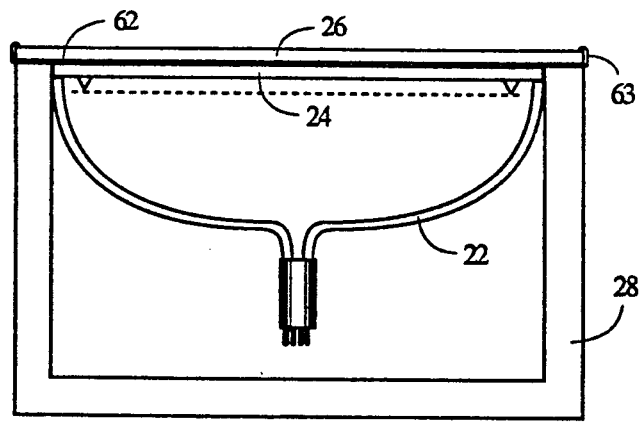

As seen is FIG. 9, by making the flat panel 26 greater in area than the faceplate 24 the cabinet 28 may be located entirely behind the flat panel 26 thereby presenting a planar front surface of the display unit comprised of the flat panel exterior surface 32. Edge finishing of the flat panel may then be desirable to reduce glare from incident light and/or to remove sharp edges. Grinding or application of capping material 63 may be suitably employed.

Figure 10:
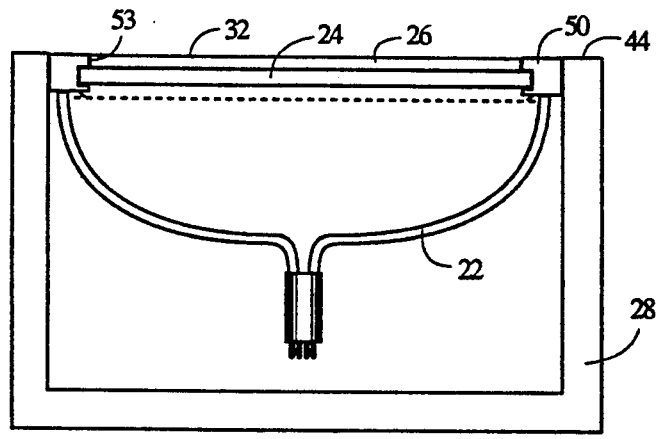

As seen in FIG. 10 mask supports 50 which are integral with the CRT bulb 22 may be suitably configured to extend over the exterior surface of the faceplate 24 to be co-planar with, and interstitial between, the flat panel exterior surface 32 and the cabinet front surface 44. The mask support structure 50 may be suitably finished as discussed above in relation to FIGS. 3 and 4 and its surfaces 53 facing the flat panel 26 may be trimmed by water-jet cutting or the like to provide the proper sized opening for the flat panel.

Figure 11:
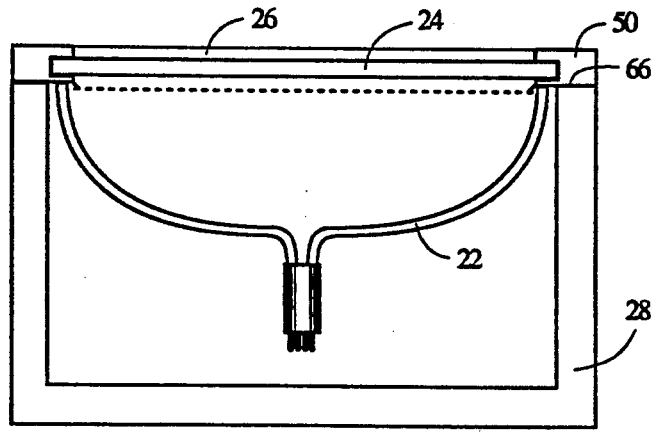

As seen in FIG. 11, the mask support structure 50 is made integral with the CRT bulb 22 and has sufficient width to allow attachment or abutment of the cabinet 28 to the rear surface 66 thereof. In this embodiment the front surface of the display device then only need comprise the forward surfaces of the flat panel and the support structure plus filler material between the two as necessary or desired to cover gaps such as may result from frit extending beyond the support structure boundary after frit sealing of the support structure 50 to the faceplate 24.

While the present invention has been illustrated and described in connection with the preferred embodiments, it is not to be limited to the particular structure shown, because many variations thereof will be evident to one skilled in the art and are intended to be encompassed in the present invention as set forth in the following claims:

What is claimed is:

1. A CRT display device comprising:
    a) a CRT bulb having a faceplate, the faceplate having a flat front surface and
    a rear surface having a luminescent screen thereon; and,
    b) a cabinet for substantially enclosing the CRT bulb except for the faceplate,
    the cabinet being configured and arranged to not extend beyond the plane of the flat front surface of the faceplate.

2. The device of claim 1 wherein:
    the cabinet has a front surface co-planar with the flat front surface of the CRT bulb.

3. The device of claim 2 further comprising filler material interstitially placed between the faceplate and the cabinet.

4. The device of claim 3 wherein the filler material comprises a shadow mask support means connected to the faceplate.

5. The device of claim 1 wherein:
    the cabinet is located entirely behind the flat front surface.

6. The device of claim 5 wherein:

the faceplate has a shadow mask support structure attached thereto, the mask support structure having a front surface coplanar with the flat front surface of the faceplate.

7. The device of claim 5 further comprising a capping material covering at least some edge plane portions of the faceplate.

8. The device of claim 7 wherein: the capping material has a front surface substantially co-planar with the flat front surface of the faceplate.

9. The device of claim 8 wherein the capping material comprises a shadow mask support means.

10. A video display device having a substantially cubic shape with a front surface defined by the location of a luminescent screen comprising:
   a) a CRT bulb with a faceplate, the faceplate having:
      a flat front surface,
      a rear surface supporting a luminescent screen, and
      a flat panel superposed over the flat front surface, the flat panel having opposed exterior and interior surfaces with flat panel interior surface facing the faceplate front surface; and,
   b) a cabinet for substantially enclosing the CRT bulb except for the flat panel, the cabinet being configured and arranged to not extend beyond the plane of the flat panel exterior surface.

11. The device of claim 10 wherein:
the flat panel is affixed to the flat front surface.

12. The device of claim 10 wherein:
the flat panel has an exterior surface area greater than that of the flat front surface.

13. The device of claim 10 wherein:
the flat panel has an exterior surface area less than that of the flat front surface.

14. The device of claim 10 wherein:
the cabinet has a front surface co-planar with the interior surface of the flat panel.

15. The device of claim 10 wherein:
the cabinet is located entirely behind the flat panel.

16. The device of claim 14 further comprising a filler material interstitially placed between the flat panel and the cabinet.

17. The device of claim 16 wherein:
the filler material comprises a shadow mask support means connected to the faceplate.

18. The device of claim 15 further comprising a capping material covering at least some edge plane portions of the faceplate.

19. The device of claim 18 wherein:
the edge cap has a front surface substantially co-planar with the exterior surface of the flat panel.

20. The device of claim 19 wherein the capping material comprises a shadow mask support means.

* * * * *